United States Patent
Uemura et al.

(10) Patent No.: US 7,802,017 B2
(45) Date of Patent: Sep. 21, 2010

(54) SERVER SYSTEM AND A POWER CONTROL METHOD IN A SERVER SYSTEM

(75) Inventors: Satoru Uemura, Hadano (JP); Takeshi Yoshida, Sagamihara (JP); Toru Inagawa, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 1134 days.

(21) Appl. No.: 11/411,810

(22) Filed: Apr. 27, 2006

(65) Prior Publication Data

US 2006/0265449 A1    Nov. 23, 2006

(30) Foreign Application Priority Data

Apr. 28, 2005  (JP) ............... 2005-130735

(51) Int. Cl.
*G06F 15/16* (2006.01)
(52) U.S. Cl. .............. 709/250; 709/203; 709/220; 709/223; 709/224; 370/252; 370/254; 714/47; 714/48; 714/49; 713/1; 713/2; 713/300; 713/340; 710/5; 710/6; 710/15
(58) Field of Classification Search ............... 709/250, 709/203, 220, 223, 224; 370/252, 254; 713/1, 713/2, 300–340; 714/7, 47–49, 57; 710/5–6, 710/15
See application file for complete search history.

(56) References Cited

U.S. PATENT DOCUMENTS 6,567,272 B1    5/2003  Merkin
7,137,014 B2 *  11/2006 Dake et al. ............ 713/300
7,353,415 B2 *  4/2008  Zaretsky et al. ......... 713/320
2002/0123345 A1 * 9/2002 Mahany et al. ......... 455/432
2003/0090878 A1   5/2003 Merkin
2004/0054780 A1   3/2004 Romero
2004/0257998 A1 * 12/2004 Chu et al. ............. 370/252
2005/0021606 A1 * 1/2005 Davies et al. .......... 709/203
2008/0273470 A1 * 11/2008 Chu et al. ............. 370/252
2009/0049291 A1 * 2/2009 Benhase et al. .......... 713/2
2010/0064023 A1 * 3/2010 Basham et al. ......... 709/213

FOREIGN PATENT DOCUMENTS

| JP | 2002-6998 A | 1/2002 |
| JP | 2003-202934 A | 7/2003 |
| JP | 2004-355351 | 12/2004 |

* cited by examiner

*Primary Examiner*—Thu Ha T Nguyen
(74) *Attorney, Agent, or Firm*—Mattingly & Malur, P.C.

(57) ABSTRACT

To provide a blade server capable of expanding disks of any servers in one chassis, the blade server has one or more server modules, one or more storage modules, a management module for managing the whole of the server, and a back plane via which a signal is transmitted among the modules wherein the server modules, the storage modules, and the management module are installed in slots. The server modules and the storage modules are interconnected via a disk interface on the back plane. Each of the server modules and the storage modules has a module management unit that controls a power in the its own module, and the module management unit controls the power in the its own module according to a power control signal sent from the management module.

5 Claims, 6 Drawing Sheets

|  | SLOT#0 | SLOT#1 | SLOT#2 | SLOT#3 |
|---|---|---|---|---|
| SERVER MODULE | 1 | 1 | 0 | 0 |
| STORAGE MODULE | 0 | 0 | 1 | 1 |

FIG.5

|  |  | SERVER MODULE | | | |
|---|---|---|---|---|---|
|  |  | SLOT#0 | SLOT#1 | SLOT#2 | SLOT#3 |
| STORAGE MODULE | SLOT#0 |  | 0 | 1 | 0 |
|  | SLOT#1 | 0 |  | 0 | 1 |
|  | SLOT#2 | 1 | 0 |  | 0 |
|  | SLOT#3 | 0 | 1 | 0 |  |

FIG.6

|  |  | SERVER MODULE | | | |
|---|---|---|---|---|---|
|  |  | SLOT#0 | SLOT#1 | SLOT#2 | SLOT#3 |
| STORAGE MODULE | SLOT#0 |  | 0 | 0 | 0 |
|  | SLOT#1 | 0 |  | 0 | 0 |
|  | SLOT#2 | 1 | 0 |  | 0 |
|  | SLOT#3 | 0 | 1 | 0 |  |

FIG.8

SERVER SYSTEM AND A POWER CONTROL METHOD IN A SERVER SYSTEM

INCORPORATION BY REFERENCE

The present application claims priority from Japanese application JP 2005-130735 filed on Apr. 28, 2005, the content of which is hereby incorporated by reference into this application.

BACKGROUND OF THE INVENTION

The present invention relates to a modular type computer system, and more particularly to the storage module of a blade server.

A rapid growth in the Internet business increases the processing demand for a computer system with an apparent increase in the management cost.

In general, a server system in the Internet business is built based on a three-tier model in which the system is built in three tiers, front-end, mid-tier, and back-end, to meet each processing need.

A blade server, in which multiple servers are installed densely in one chassis, is used for a front-end server that performs the services of a Web server because the dependence among the servers is low. On the other hand, a standalone SMP (Symmetric Multi Processor) server is used for a back-end server that functions primarily as a DB server because the data processing load is heavy and data integrity must be ensured.

Conventionally, different server devices are used for those functional units to build a system. One of the problems with such a system is that the processing performance cannot be allocated among those server devices and, therefore, the devices must be added or replaced individually to meet a change in the application requirements. In a system that is built based on the conventional method described above, TCO (Total Cost of Ownership) cannot be reduced because the hardware is distributed and it is difficult to improve the server operating rate of the whole system.

To solve the problem described above, the focus of attention is now on the integration of the hardware, especially, on the integration of various server functions that is made possible by the expanded application of a blade server. A conventional blade server, which can contain only one or two built-in disks because of its high-density installation feature, has a limited server application. However, if a flexible disk configuration, such as the RAID configuration or JBOD (Just Bunch of Disks), is used to make it possible to provide a server device that expands the application of each blade server to increase the efficiency of the integration of the distributed hardware, a server device useful for server consolidation will be provided.

Although conventional technologies for a modular type computer system such as a blade server are disclosed, for example, in US2003/0090878A1, US2004/0054780A1, and JP-A-2004-355351, a flexible disk configuration for use in a blade server is not yet disclosed.

SUMMARY OF THE INVENTION

As described above, a general blade server has one or two built-in disks and, at the RAID level, mirroring is carried out at best. Increasing the number of disks and increasing the flexibility in the disk configuration with the use of RAID5 or spare disks are efficient for building a high-reliability, high-installation-density server.

It is an object of the present invention to provide a blade server that allows disks to be added to a server in one chassis.

The present invention provides a blade server system comprising a plurality of server modules and a management module that manages the whole of the system. The server module slots are connected via the disk interface on the back plane. One or more storage modules, each having a hard disk, are installed in any server modules slot to allow the storage modules to function as additional disks or specific server modules.

According to the present invention, the management module has an interface for identifying the server modules and the storage modules installed in the server slots, the interlock between the server modules and the storage modules is defined by the module identification information, and the power interlock between the server modules and the storage modules is controlled according to the defined interlock.

The blade server system according to the present invention allows an additional disk of a server to be installed on a chassis as a module that is slot-compatible with a server module, thus enabling a server having a disk is added according to the application need and an ordinary server to be mixed in one chassis. Therefore, as compared with a general blade server, the blade server according to the present invention increases the server configuration flexibility and the installation density.

Other objects, features and advantages of the invention will become apparent from the following description of the embodiments of the invention taken in conjunction with the accompanying drawings.

BRIEF DESCRIPTION OF THE DRAWINGS

FIG. 6 is a diagram showing the contents of interlock configuration information.

DESCRIPTION OF THE EMBODIMENTS

Figure 1:
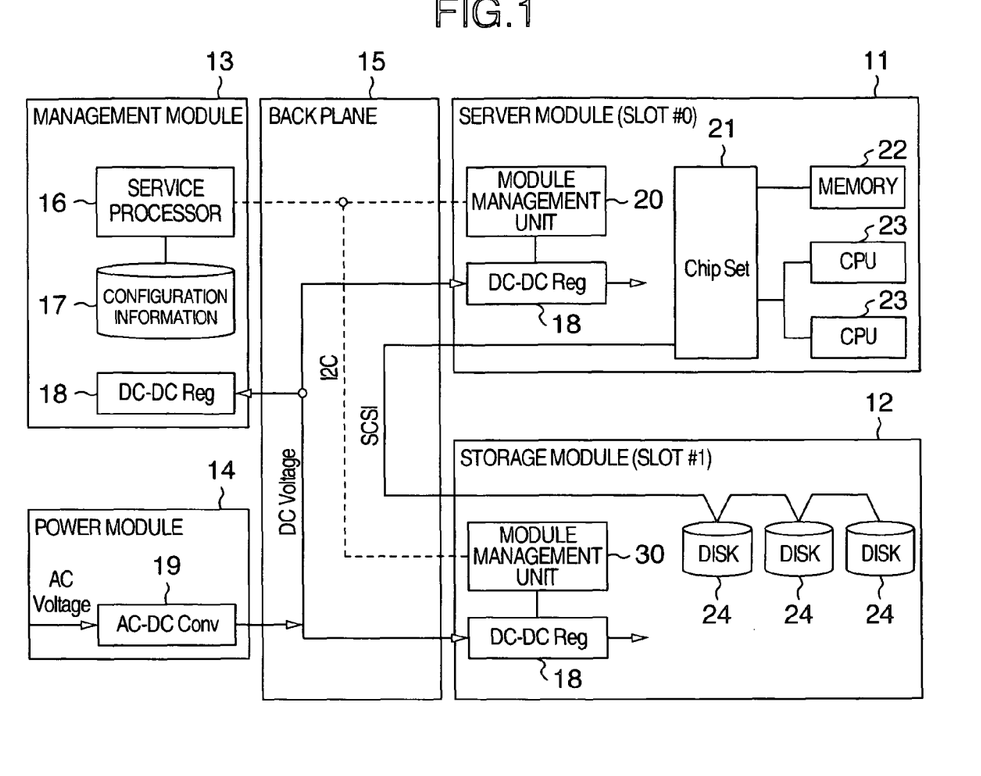
FIG. 1 is a diagram showing the configuration of one embodiment of a blade server of the present invention.

FIG. 1 is a diagram showing the configuration of a blade server system in one embodiment of the present invention. FIG. 1 shows an example of the simplest configuration comprising one server module 11 and one storage module 12.

In the server module 11, a memory 22 is connected to a CPU 23, which performs the processing of various applications, via a chip set 21. The chip set 21 is connected to a hard disk 24, installed in a storage module 12, via the SCSI bus on a back plane 15. A module management unit 20 collects various monitor signals of the server module and sends the collected monitor signals to a management module 13 via a I2C I/F. The module management unit 20 receives the power control signal from the management module 13 and instructs a DC-DC regulator 18 to output and shut down the power in the module. The module management unit 20 sends module identification information to the management module 13 via the I2C I/F. Note that a standby power is constantly supplied to all module management units.

The storage module 12, in which one or more hard disks 24 are installed, is connected to the SCSI I/F on the back plane. A module management unit 30 collects the status of the installed hard disks and the monitor signal of the storage module and notifies them to the management module 13. In addition, the module management unit 30 receives the power control signal from the management module 13 to control the output and the shutdown of the power in the module.

The management module 13 uses a service processor 16 to turn on, shut down, and monitor the power of the modules via the I2C I/F. In addition, the management module 13 saves the identification information on the modules, installed in the slots, in a configuration information file 17 as the device configuration information. The management module 13 is inserted into a management module slot (not shown in drawings).

A power module 14 converts the AC power input to the DC power via an AC-DC converter 19 and supplies the power to the modules via the power-supply line on the back plane 15. Two or more power modules 14 may be connected in parallel in a redundant configuration.

The back plane 15 is a board for wiring various I/Fs among modules. Although the block diagram shown in FIG. 1 is an example in which one server module and one storage modules are provided, any number of server modules and storage modules may be installed and any combination of module positions may be built by changing the wiring on the back plane.

Figure 7:
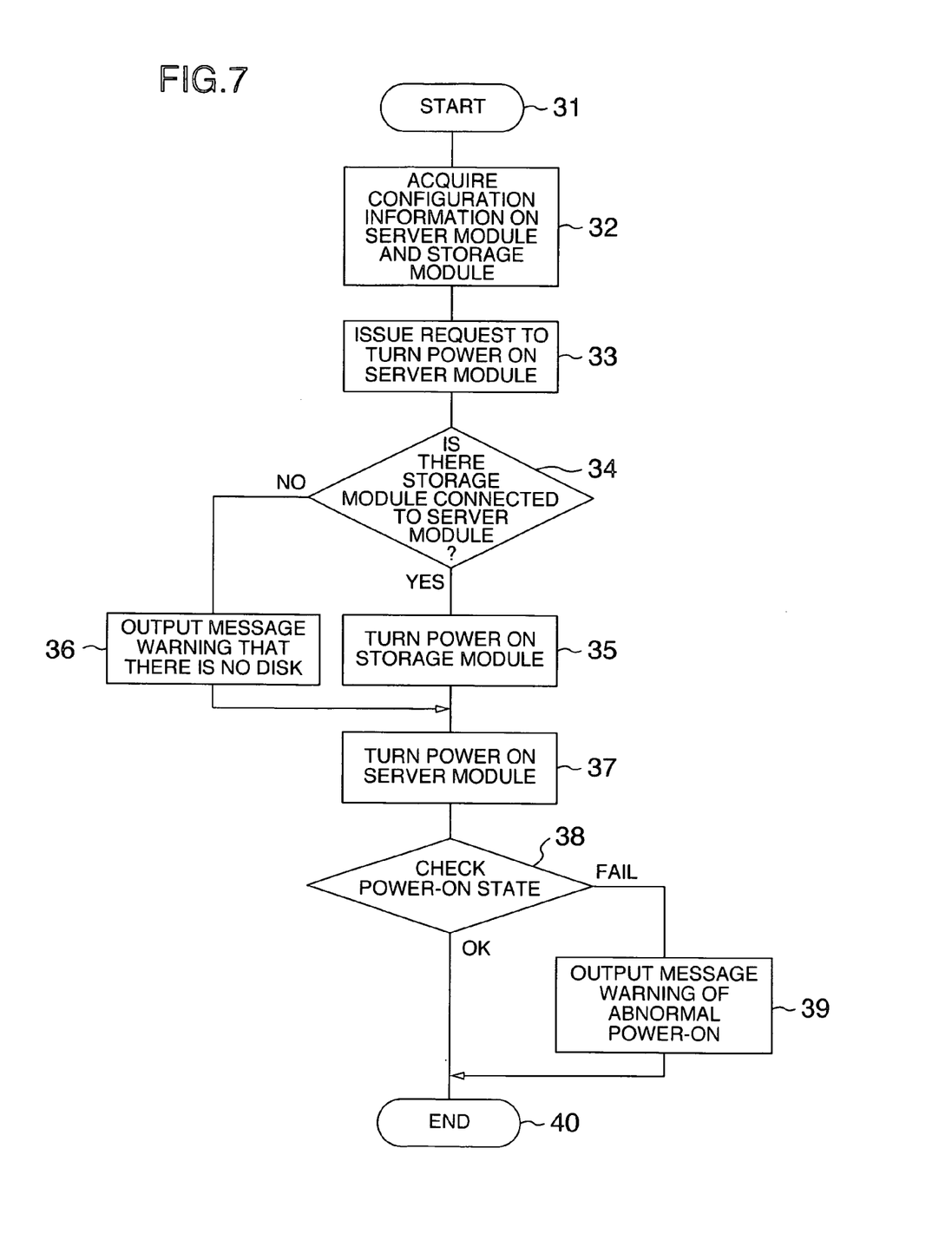
FIG. 7 is a processing flowchart showing power interlock control.

FIG. 7 shows the procedure for performing power interlock control in the configuration described above via the management module 13.

When modules are installed in the slots, the management module 13 acquires information on the types of modules installed in the slots via the I2C I/F and saves the acquired information in the configuration information file 17 as the device configuration information. To determine whether or not the server module and the storage module in specific slots are connected, the management module holds the I/F connection contents on the back plane as the system-specific back plane connection information and compares the information with the device configuration information in the configuration information file 17. In the example in FIG. 1, the interlock configuration information is defined in the configuration information file 17 indicating that the server module 11 is installed in slot #0, the storage module 12 is installed in slot #1, and the server module 11 in slot #0 is interlocked with the storage module 12 in slot #1 (step 32).

When a request to turn on the power of the server module 11 is issued in the above condition (step 33), the service processor 16 of the management module 13 refers to the interlock configuration information in the configuration information file 17 (step 34) and sends the power-on signal to the module management unit 30 of the storage module 12, with which the server module 11 is interlocked, via the I2C I/F. In response to the power-on signal, the module management unit 30 of the storage module 12 turns on the power of the storage module 12 (step 35). If there is no storage module connected to the server module 11, a warning message is output (step 36).

Upon recognizing that the storage module 12 is turned power on, the management module 13 sends the power-on signal to the module management unit 20 of the server module 11 via the I2C I/F. In response to the power-on signal, the module management unit 20 of the server module 11 turns on the power of the server module 11 (step 37). The management module 13 checks the power-on state (step 38) and, if an abnormal condition is found, outputs a warning message (step 39). The above procedure completes the power interlock between the storage module 12 and the server module 11.

Figure 2:
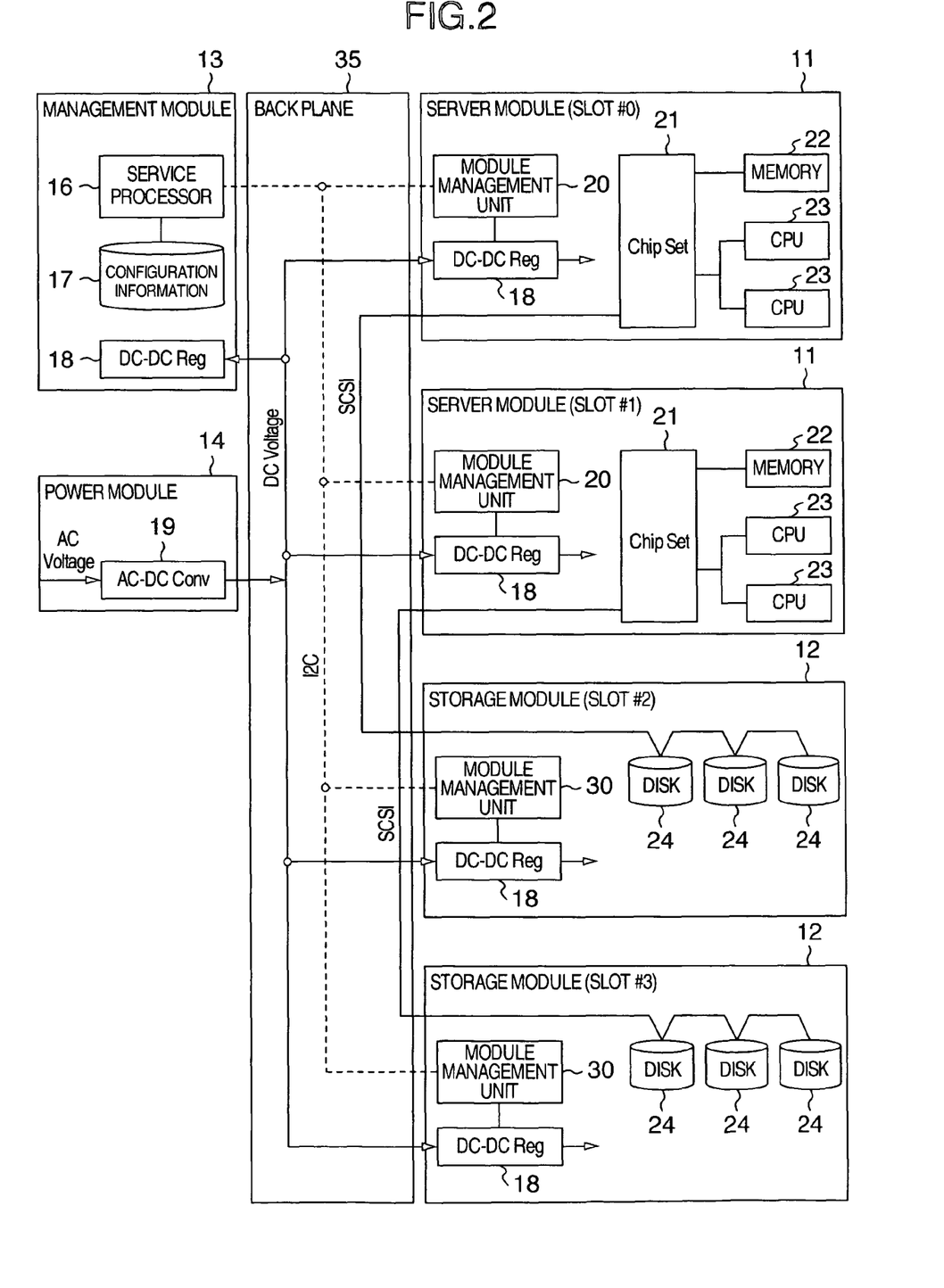
FIG. 2 is a diagram showing the configuration of another embodiment of a blade server of the present invention.
Figure 8:
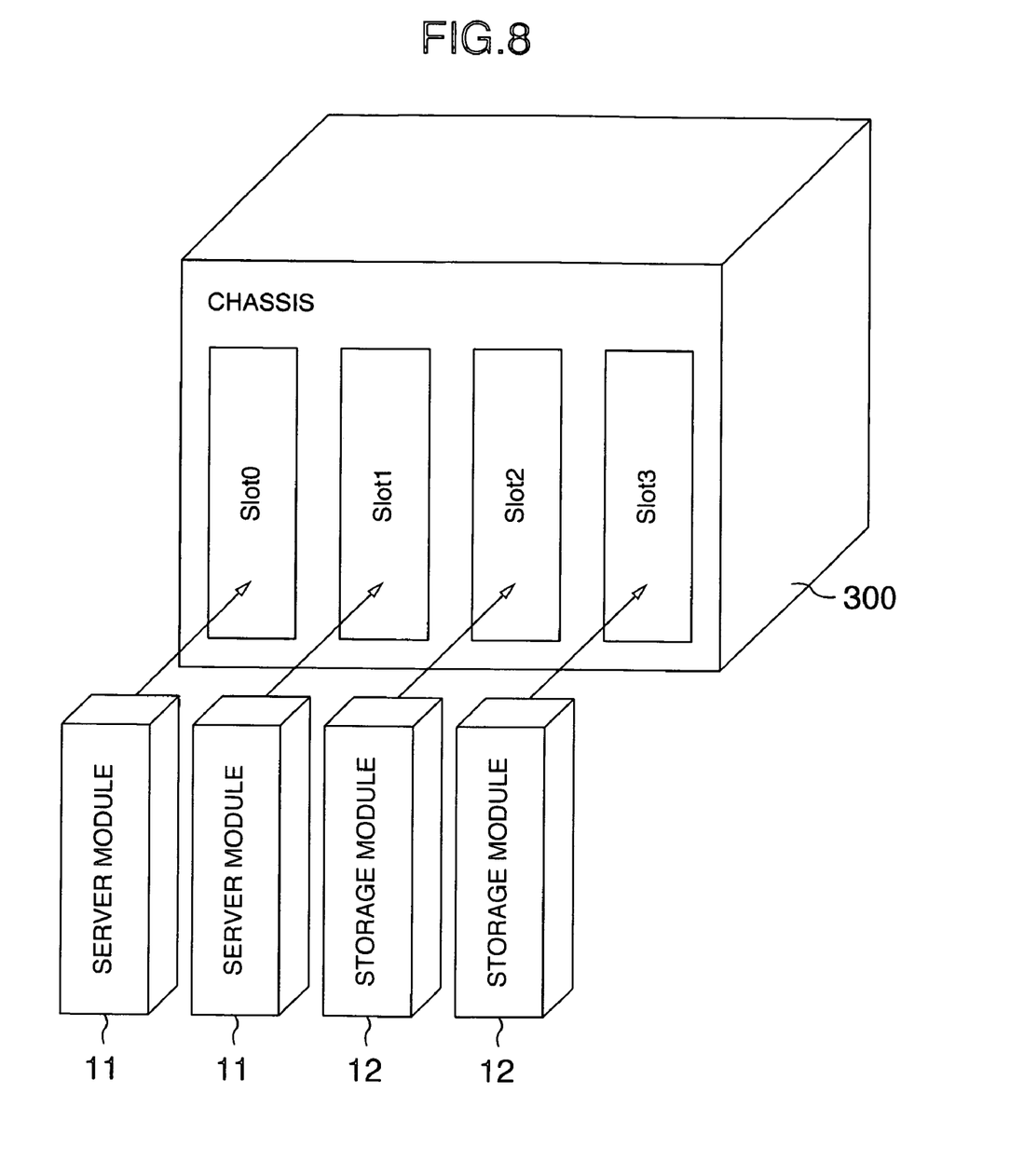
FIG. 8 is a diagram showing the installation of modules into the chassis of the device.

FIG. 2 shows an example of the configuration of another embodiment in which there are multiple modules. FIG. 8 is a diagram showing the installation of the modules in a device chassis 300 in the configuration example in FIG. 2. As shown in the figure, the storage modules 12 are installed in slots #2 and #3 in which the server modules 11 can be installed.

Figure 4:
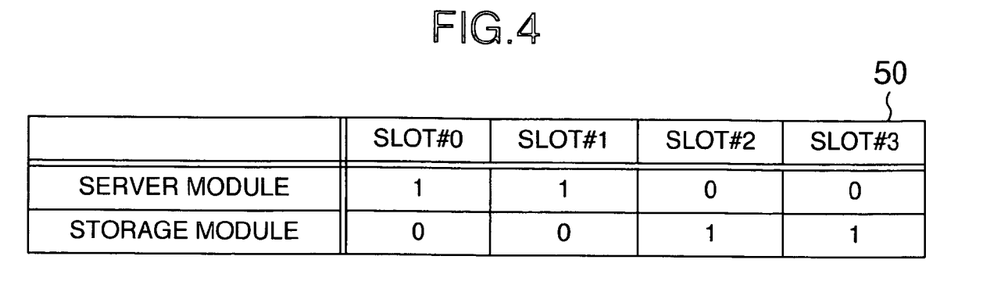
FIG. 4 is a diagram showing the contents of device configuration information.
Figure 5:
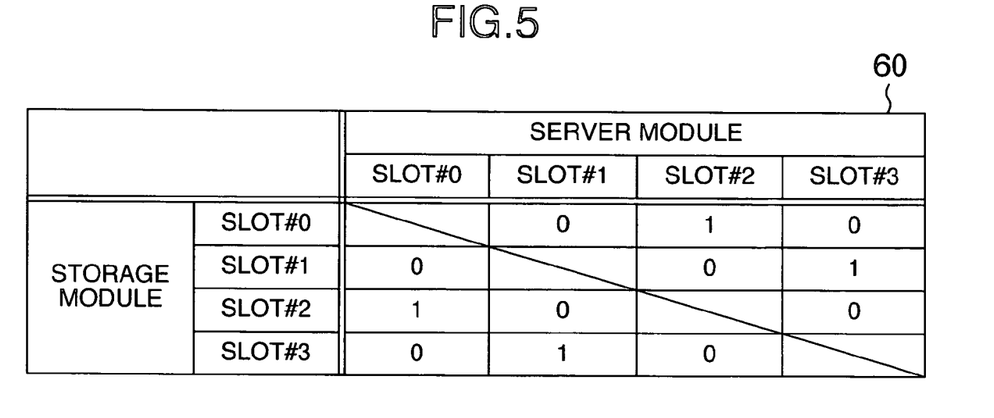
FIG. 5 is a diagram showing the contents of back plane connection information.

The server modules 11 are installed in slots #0 and #1, the storage modules 12 are installed in slots #2 and #3, and the status is saved in device configuration information 50 shown in FIG. 4. On a back plane 35, slot #0 is connected to slot #2 and slot #1 is connected to slot #3 respectively via the SCSI I/F respectively, and the connection status is saved in back plane connection information 60 shown in FIG. 5. The storage module in slot #2 is defined for the server module in slot #0, and the storage module in slot #3 is defined for the server module in slot #1, respectively, as a power interlock slot and the relation is written in interlock configuration information 70 shown in FIG. 6. The servers operate independently and, therefore, the power interlock procedure is the same as that described in FIG. 1.

Figure 6:
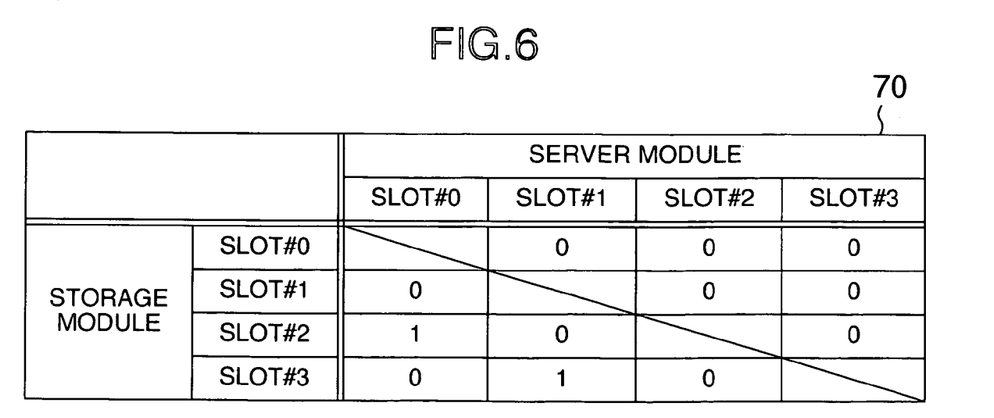

When one storage module is installed but there are multiple paths to server modules, the information is written in the interlock configuration information 70 as follows. When the modules are installed in the slots, the system-defined initial connection mode (for example, the mode in which the storage module is connected to a server module with the smallest slot number) is written as the interlock configuration information 70 in the configuration information file 17. To change the connection mode, the user can rewrite the interlock configuration information 70 in the configuration information file 17 via the service processor 16 before turning on the power.

Figure 3:
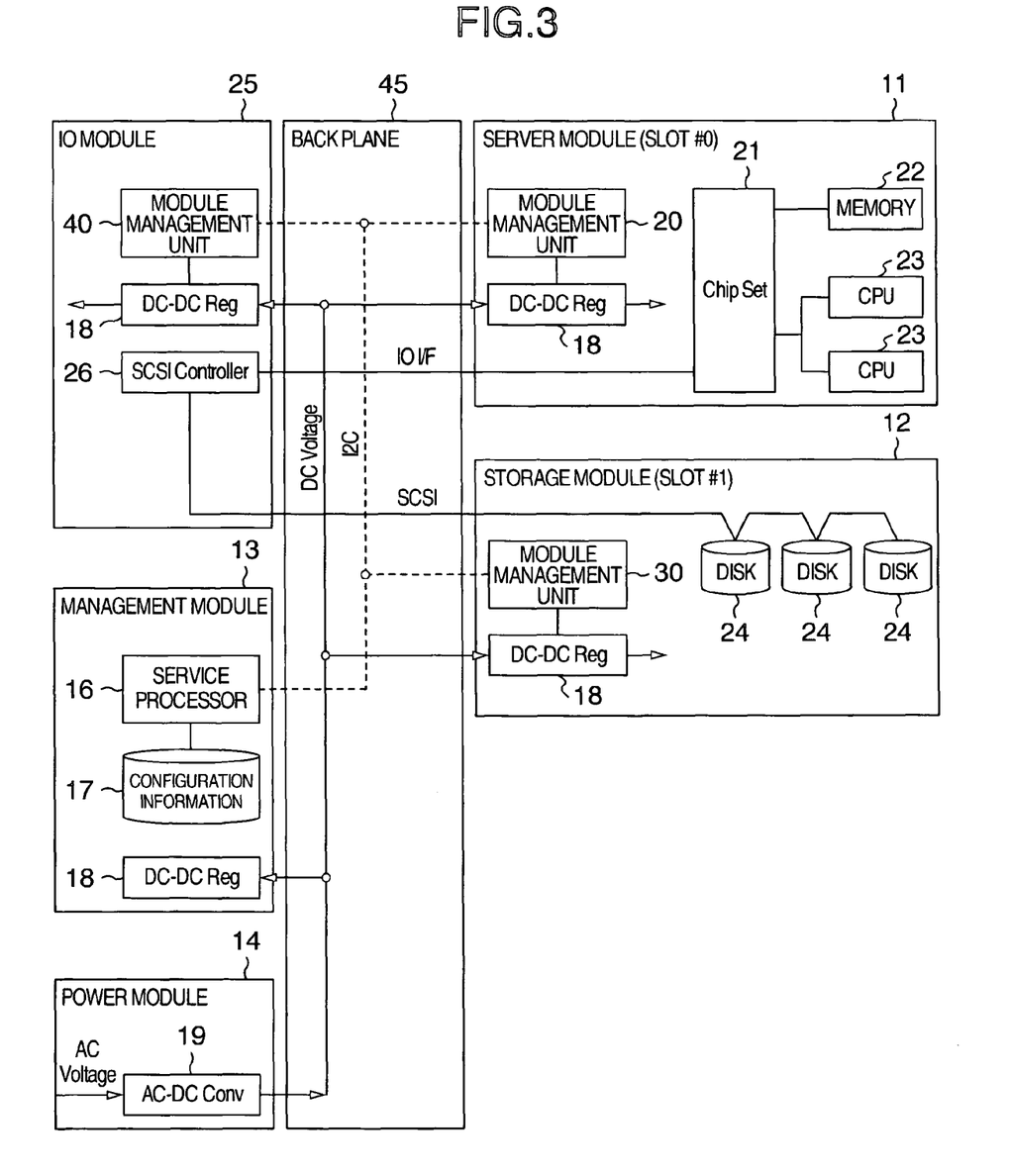
FIG. 3 is a diagram showing the configuration of a still another embodiment of a blade server of the present invention.

FIG. 3 shows still another embodiment of the present invention. This embodiment differs from the embodiment shown in FIG. 1 in that an IO module 25 is added and that the server module I/F and a back plane 45 are connected differently. The IO module is for controlling various input/output via various IO interfaces and it is inserted into an IO module slot (not shown.)

A SCSI controller 26 of the IO module 25 is connected to the chip set 21 of the server module 11 via the IO I/F (PCI bus, etc.) on the back plane 45, and the SCSI controller 26 is connected to the hard disk 24 of the storage module 12 via the SCSI bus on the back plane 45. A module management unit 40 of the IO module 25 collects various monitor signals of the IO module 25 and sends the collected monitor signals to the management module 13 via the I2C I/F. In addition, the module management unit 40 of the IO module 25 receives the power control signal from the management module 13 and instructs the DC-DC regulator 18 to output or shut down the power in the module.

The following snows the power interlock procedure in the embodiment shown in FIG. 3.

When the modules are installed in the slots, the management module 13 acquires the configuration of the modules installed in the slots via the I2C I/F. In the example shown in FIG. 3, in addition to the IO module 25, the server module 11 is installed in slot #0 and the storage module 12 is installed in slot #1. The information, indicating that the IO module 25 and the storage module 12 in slot #1 are power-interlocked with the server module 11 in slot #0, is defined in the configuration information file 17 (interlock configuration information 70).

When a request to turn on the power of the server module 11 is issued in the above condition, the service processor 16 of the management module 13 refers to the configuration information file 17 and sends the power-on signal to the module management units of the IO module 25 and the storage module 12, which are interlocked with the server module 11, via the I2C I/F. In response to the power-on signal, the module management units of the IO module 25 and the storage module 12 turn on the power of the modules.

Upon recognizing that the IO module 25 and the storage module 12 are turned power on, the management module 13 sends the power-on signal to the module management unit 20 of the server module 11 via the I2C I/F. In response to the power-on signal, the module management unit 20 of the server module 11 turns on the power of the server module 11. The above procedure completes the power interlock between the storage module 12 and the server module 11.

As described above, the blade server system according to the present invention allows a storage module to be installed in a server module slot, thus enabling the disks of the blade server to be configured flexibly.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A server device comprising:
one or more server modules;
one or more storage modules;
a management module for managing a whole of the server device; and
a back plane via which a signal is transmitted among the modules,
said server modules, said storage modules, and said management module being installed in slots of said server device,
wherein each of said one or more server modules and said one or more storage modules has a module management unit that controls power of its own module,
said management module has an interface for identifying types of the modules installed in the slots, and stores information on connection between the one or more server modules and one or more storage modules on the back plane,
when an installed one or more server modules and one or more storage modules is installed in the slot, said management module obtains a type of the installed module from the interface to store the obtained module type in a configuration information file,
said management module compares the connection information with the configuration information file to generate an interlock relation between the one or more server modules and the one or more storage modules and stores the interlock relation as interlock configuration information,
when receiving a request for turning on power of a target server module, said management module refers to the interlock configuration information to identify one of the one or more storage modules interlocked with the target one of the one or more server modules which is the target of the power-on request,
said management module sends a power-on signal to the module management unit of the identified storage module to turn on power of the identified storage module;
upon recognizing the power is on of the identified storage module, said management module sends a power-on signal to the module management unit of the target server module to turn on power of the target server module.

2. The server device according to claim 1 wherein the interlock configuration information, generated by said management module, can be modified in response to input of a user to set up the interlock between the server modules and the storage modules.

3. A server device comprising:
one or more server modules;
one or more storage modules;
an IO module for controlling input/output of the server device;
a management module for managing a whole of the server device;
and a back plane via which a signal is transmitted among the modules,
said server modules, said storage modules, said IO module, and said management module being installed in slots,
wherein each of said one or more server modules, said one or more storage modules, and said IO module has a module management unit for controlling power in its own module,
said management module has an interface for identifying types of installed modules of the one or more server modules and one or more storage modules installed in the slots, and stores information on connection between the one or more server modules and the one or more storage modules or the IO module on the back plane,
when the installed one of the one or more server modules and one or more storage modules is installed in the slot, said management module obtains a type of the installed module from the interface to store the obtained module type in a configuration information file,
said management module compares the connection information with the configuration information file to generate an interlock relation between the one or more server modules and the one of more storage modules and the IO module, and stores the interlock relation as interlock configuration information,
when receiving a request for turning on power of a target one of the one or more server modules that is the target of the power-on request, said management module refers to the interlock configuration information to identify one of the one or more storage modules and the IO module interlocked with the target server module,
said management module sends power-on signals to management module units of the identified storage module and the identified IO module to turn on power of the identified storage module and power of the identified IO module;
upon recognizing the power is on of the identified storage and IO modules, said management module sends a power-on signal to the module management unit of the target server module to turn on power of the target server module.

4. The server device according to claim 3 wherein the interlock configuration information, generated by said management module, can be modified in response to input of a user to set up the interlock among the server modules, the storage modules, and the IO module.

5. A server device comprising:
a plurality of slots in which server modules and storage modules are installed;

a management module for managing a whole of the server device and having storage means for storing management information; and a back plane for enabling signal transmission between the server modules and storage modules installed in said slots and said management module, said back plane having wiring that connects between the slots via a disk interface, wherein each of said server modules and said storage modules has a module management unit for controlling power in its own module, said management module stores back plane connection information on the disk interface in said storage means, said management module has an interface for acquiring identification information on the modules from the modules installed in the slots, creates device configuration information corresponding to slot positions based on the acquired identification information, and stores the created device configuration information in said storage means, said management module creates interlock configuration information, which defines an interlock between the server modules and the storage modules, based on the back plane connection information and the device configuration information stored in said storage means and stores the created interlock configuration information in said storage means, and in response to a server module power-on request, said management module refers to the created interlock configuration information to identify one of the storage modules that is interlocked with the target server module and issues a power-on instruction first to the identified storage module to turn on power of the identified storage module and then issues a power-on instruction to the target server module, if there is no storage module to be interlocked with the target server module when referring to the created interlock configuration information in response to a server module power-on request, said management module issues a warning.

* * * * *